US007983711B2

(12) United States Patent
Juneja et al.

(10) Patent No.: US 7,983,711 B2
(45) Date of Patent: Jul. 19, 2011

(54) SOFTWARE ARCHITECTURE FOR DUAL MODE PHONE AND METHOD OF USE

(75) Inventors: Anupam Juneja, San Diego, CA (US); Yash Kharia, San Diego, CA (US); Atul Suri, San Diego, CA (US); Mehul B. Patel, Bangalore (IN); Digambar Laxman Rasal, Ribandar (IN); Joel King, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1235 days.

(21) Appl. No.: 11/467,081

(22) Filed: Aug. 24, 2006

(65) Prior Publication Data
US 2008/0051130 A1  Feb. 28, 2008

(51) Int. Cl.
*H04M 1/00* (2006.01)
(52) U.S. Cl. ............ 455/553.1; 455/552.1; 455/557
(58) Field of Classification Search ........... 455/552.1, 455/553.1, 557, 426.1, 84
See application file for complete search history.

(56) References Cited

U.S. PATENT DOCUMENTS

| 6,470,430 | B1 | 10/2002 | Fischer et al. |
| 6,553,223 | B1 | 4/2003 | Bayley et al. |
| 7,107,044 | B1* | 9/2006 | Zaidi et al. ............ 455/412.1 |
| 7,277,724 | B2* | 10/2007 | Jones et al. ............ 455/553.1 |
| 7,389,122 | B2* | 6/2008 | Chin .................... 455/525 |
| 7,706,796 | B2* | 4/2010 | Rimoni et al. ........... 455/436 |
| 7,801,555 | B2* | 9/2010 | Jain et al. .............. 455/552.1 |
| 7,848,754 | B2* | 12/2010 | Kim et al. .............. 455/436 |
| 2002/0118735 | A1 | 8/2002 | Kindred |
| 2002/0173338 | A1* | 11/2002 | Neumann et al. ......... 455/552 |
| 2003/0165130 | A1* | 9/2003 | Wodzianek et al. ....... 370/338 |
| 2004/0176059 | A1* | 9/2004 | Hayem et al. ........... 455/168.1 |
| 2004/0213262 | A1* | 10/2004 | Choi ................... 370/395.5 |
| 2005/0038962 | A1 | 2/2005 | Lim |
| 2006/0062216 | A1* | 3/2006 | Li et al. ............... 370/389 |
| 2006/0068836 | A1* | 3/2006 | Nickel ................. 455/552.1 |
| 2007/0021143 | A1* | 1/2007 | Jain et al. ............. 455/552.1 |
| 2007/0105587 | A1* | 5/2007 | Lu .................... 455/552.1 |
| 2007/0160017 | A1* | 7/2007 | Meier et al. ............ 370/338 |
| 2007/0297357 | A1* | 12/2007 | Todd et al. ............. 370/328 |
| 2008/0002605 | A1* | 1/2008 | Todd et al. ............. 370/328 |
| 2008/0019333 | A1* | 1/2008 | Kharia et al. ........... 370/338 |

* cited by examiner

*Primary Examiner* — Lester Kincaid
*Assistant Examiner* — Steven Kelley (57) ABSTRACT

Alternative software architectures for a dual mode wireless communication device and methods of use are provided for efficient and effective use of the processor and memory capabilities of first and second air interface processors on a dual mode wireless communication device. The alternative architectures efficiently distribute a plurality of operational modules across the processors for efficient dual mode operation of a dual mode wireless communication device. Procedures for transitioning into a second air interface mode from a first air interface mode and vice versa are also disclosed. These seamless transitions can be based on user preferences and/or real time environmental variables such as signal strength or availability.

14 Claims, 6 Drawing Sheets

SOFTWARE ARCHITECTURE FOR DUAL MODE PHONE AND METHOD OF USE

TECHNICAL FIELD

The present invention generally relates to wireless communication devices and more particularly relates to efficient use of processor and memory resources one dual mode wireless communication devices.

BACKGROUND

Conventional dual mode wireless communication devices are inefficient in their use of resources, in particular during dual mode operation. One significant disadvantage of these conventional devices is the inefficient software architecture employed by these devices that inherently cause the device to operate inefficiently. Additionally, conventional dual mode devices lack the ability to seamlessly transition between different air interface modes of operation when the network for a first air interface cannot be acquired or when the signal strength is too low to maintain a connection on the first or second air interface. Accordingly, what is needed is a system and method that addresses these problems with the conventional dual mode communication devices and their methods of use.

SUMMARY

Described herein are software architectures for a dual mode wireless communication device and a method of use for the architecture and device that provides efficient and effective use of the processor and memory capabilities of a first air interface and the processor and memory capabilities of a second air interface on the dual mode wireless communication device. Various architectures are described that efficiently spread a plurality of operational modules across first and second air interface processors for efficient dual mode operation of a dual mode wireless communication device. Additionally disclosed are procedures for transitioning from a first air interface mode to a second air interface mode and vice versa based on user preferences, environmental variables, and factors such as signal strength or availability.

Among others, certain advantages of the software architectures and method of use include: (1) flexibility for future modifications based on the modular and extensible architecture; (2) minimal changes to the existing user interface and applications; (3) abstractions to third party interfaces; and (4) simplified portability to various air interface chip solutions. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts.

DETAILED DESCRIPTION

Certain embodiments as disclosed herein provide for an efficient architecture for a dual mode wireless communication device and methods of use for dual mode operation of the device. For example, one embodiment provides for a dual mode wireless communication device to acquire a connection from a second air interface when a first air interface connection is unavailable or when the second air interface connection is preferred.

After reading this description it will become apparent to one skilled in the art how to implement the invention in various alternative embodiments and alternative applications. In particular, the primary embodiment described herein references a dual mode wireless communication with air interfaces for a code division multiple access ("CDMA") network and an 802.11(x) ("WiFi") network. However, in alternative embodiments the air interfaces of the dual mode wireless communication device may provide access to other cellular networks such as GSM and other data networks such as WiMax. Accordingly, it should be understood that the primary embodiment described herein is presented by way of example only, and should not be construed to limit the scope or breadth of the present invention.

Figure 1:
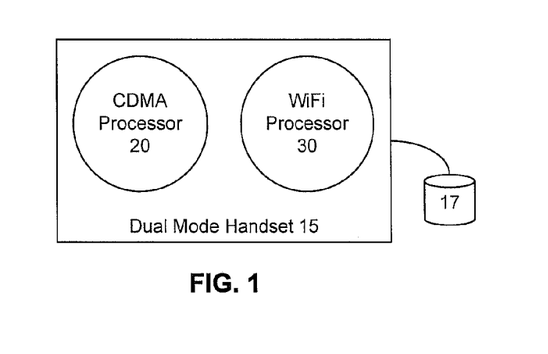
FIG. 1 is a high level block diagram illustrating an example dual mode wireless communication device according to an embodiment of the present invention.

FIG. 1 is a high level block diagram illustrating an example dual mode wireless communication device 15 according to an embodiment of the present invention. In the illustrated embodiment, the dual mode device 15 comprises CDMA processor 20 and WiFi processor 30. Device 15 is also configured with data storage area 17.

Wireless communication device 15 can be any of a variety of wireless communication devices, including a cell phone, personal digital assistant ("PDA"), personal computer ("PC"), laptop computer, PC card, special purpose equipment, or any combination of these and other devices capable of establishing a wireless communication link over a wireless communication network (not shown). The wireless communication device 15 may also be referred to herein as a handset, wireless device, mobile device, device, wireless unit, or mobile unit.

A wireless communication network may include a plurality of networks including private, public, circuit switched, packet switched, personal area networks ("PAN"), local area networks ("LAN"), wide area networks ("WAN"), metropolitan area networks ("MAN"), or any combination of the these.

Other network types may also be included as needed to facilitate wireless communications by device 15 on a CDMA network or a WiFi network.

Data storage area 17 that is configured with wireless communication device 15 can be any sort of internal or external memory device and may include both persistent and volatile memories. The function of data storage area 17 is to maintain data for long term storage and also to provide efficient and fast access to instructions for applications that are executed by the respective device or module.

Figure 2:
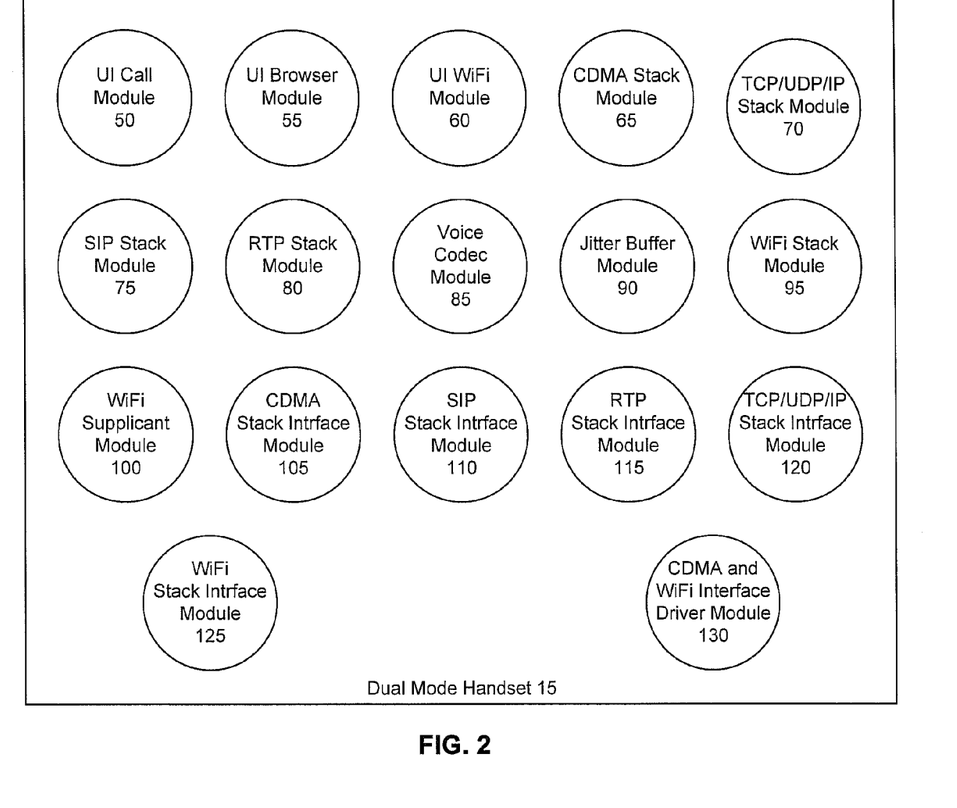
FIG. 2 is a block diagram illustrating a plurality of modules of an example dual wireless communication device according to an embodiment of the present invention.

FIG. 2 is a block diagram illustrating a plurality of modules of an example dual wireless communication device 15 according to an embodiment of the present invention. In the illustrated embodiment, handset 15 configured for dual mode operation comprises user interface call module 50, user interface network browser module 55, user interface WiFi module 60, CDMA stack module 65, TCP/UDP/IP stack module 70, SIP stack module 75, RTP stack module 80, voice codec module 85, jitter buffer module 90, WiFi stack module 95, WiFi supplicant module 100, CDMA stack interface module 105, SIP stack interface module 110, RTP stack interface module 115, TCP/UDP/IP stack interface module 120, WiFi stack interface module 125, and CDMA and WiFi interface driver module 130.

In combination, the various modules 50 through 130 provide handset 15 with the capability to communication over a CDMA network and also a WiFi network. The various user interfaces, module interfaces, communication stacks, and other modules facilitate a functional dual mode handset in operation.

Figure 3:
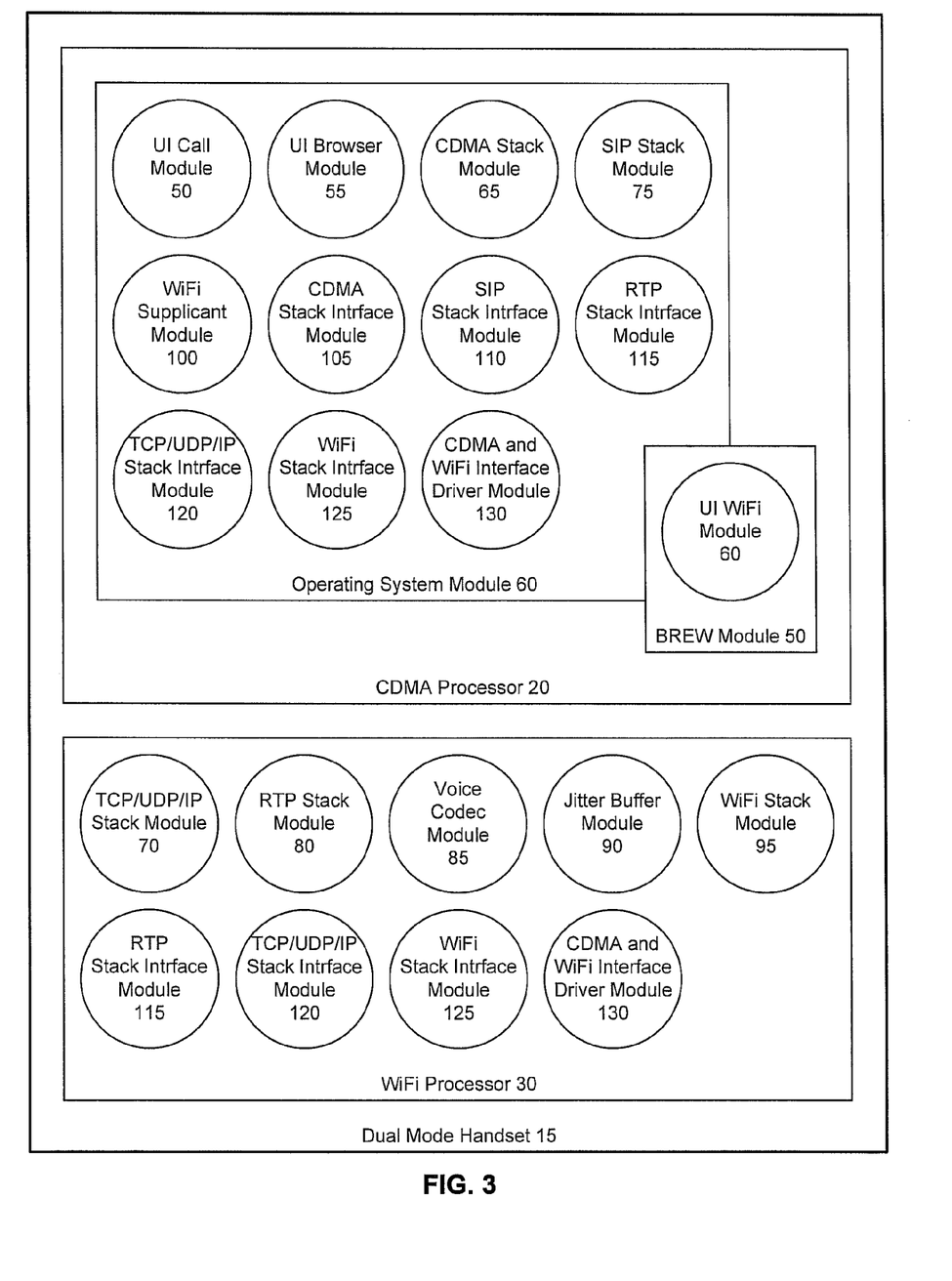
FIG. 3 is a block diagram illustrating an example software architecture for a dual mode wireless communication device according to an embodiment of the present invention.

FIG. 3 is a block diagram illustrating a first example software architecture for dual mode handset 15 according to an embodiment of the present invention. In the illustrated embodiment, handset 15 comprises CDMA processor 20 and WiFi processor 30. The various modules that comprise a dual mode handset as previously described in FIG. 2 are distributed for execution and operation on the two processors.

CDMA processor 20 comprises operating system module 60 and BREW module 50. BREW module 50 is configured to execute user interface WiFi module 60 when the user is communicating over the WiFi network.

Operating system module 60 is configured to execute user interface call module 50, user interface network browser module 55, CDMA stack module 65, SIP stack module 75, WiFi supplicant module 100, CDMA stack interface module 105, SIP stack interface module 110, RTP stack interface module 115, TCP/UDP/IP stack interface module 120, WiFi stack interface module 125, and CDMA and WiFi interface driver module 130.

WiFi processor 30 is configured to execute TCP/UDP/IP stack module 70, RTP stack module 80, voice codec module 85, jitter buffer module 90, WiFi stack module 95, RTP stack interface module 115, TCP/UDP/IP stack interface module 120, WiFi stack interface module 125, and CDMA and WiFi interface driver module 130. Although CDMA processor 20 and WiFi processor 30 redundantly execute some of the modules, this redundancy provides an efficient scheme for robust communications in either CDMA mode or WiFi mode. Advantageously, CDMA processor 20 and WiFi processor 30 each execute CDMA and WiFi interface driver module 130, which provides a communication interface between the two processors and modes of operation.

Figure 4:
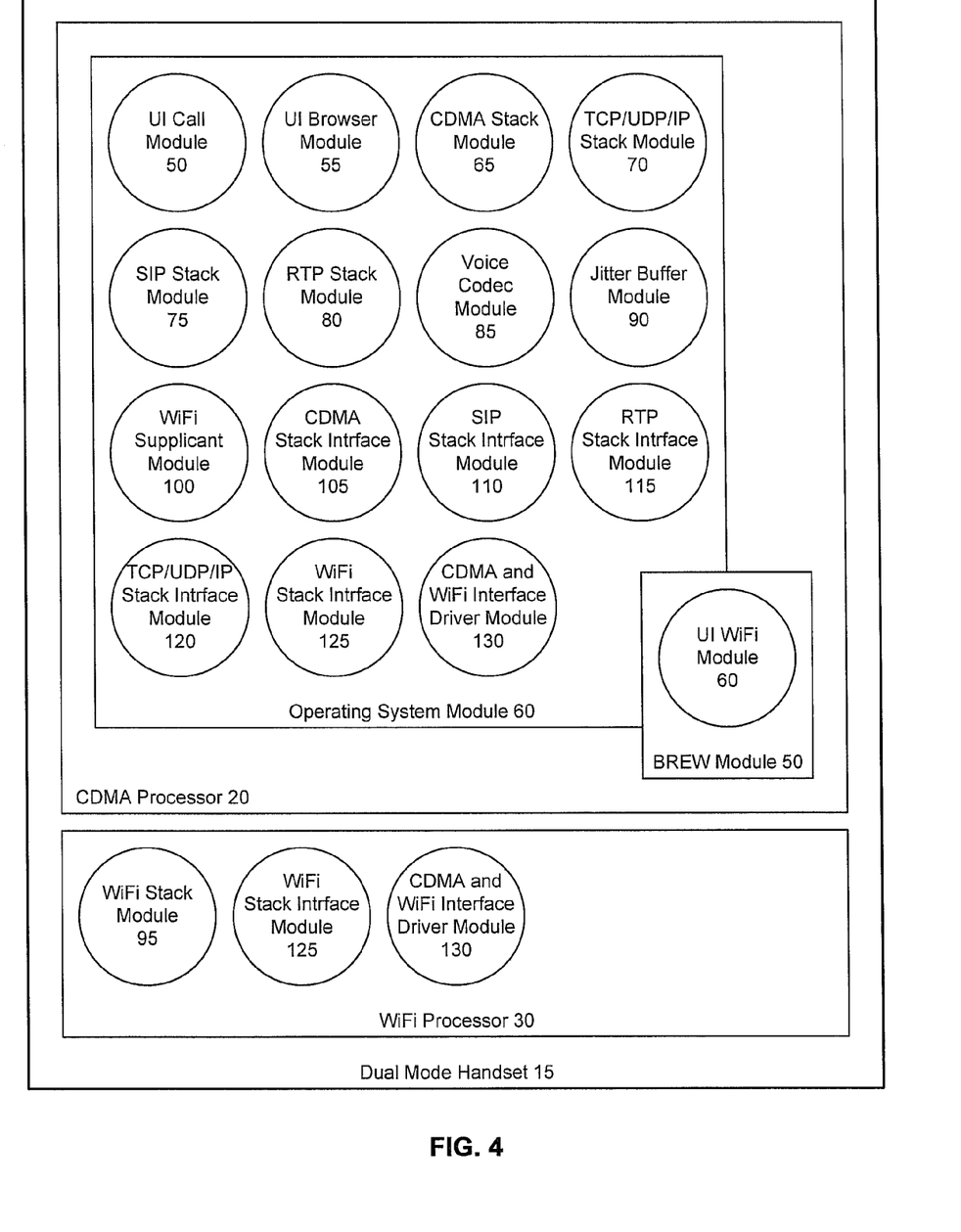
FIG. 4 is a block diagram illustrating an example alternative software architecture for a dual mode wireless communication device according to an embodiment of the present invention.

FIG. 4 is a block diagram illustrating an alternative example alternative software architecture for dual mode handset 15 according to an embodiment of the present invention. In the illustrated embodiment, handset 15 comprises CDMA processor 20 and WiFi processor 30. The various modules that comprise a dual mode handset as previously described in FIG. 2 are distributed for execution and operation on the two processors.

In the illustrated architecture, the majority of the modules are advantageously deployed on CDMA processor 20 (which comprises operating system module 60 and BREW module 50) and enabled by operating system module 60. BREW module 50 is configured to execute user interface WiFi module 60 when the user is communicating over the WiFi network.

Operating system module 60 is configured to execute user interface call module 50, user interface network browser module 55, user interface CDMA stack module 65, TCP/UDP/IP stack module 70, SIP stack module 75, RTP stack module 80, voice codec module 85, jitter buffer module 90, WiFi supplicant module 100, CDMA stack interface module 105, SIP stack interface module 110, RTP stack interface module 115, TCP/UDP/IP stack interface module 120, WiFi stack interface module 125, and CDMA and WiFi interface driver module 130.

In the illustrated architecture, the modules deployed on WiFi processor 30 are advantageously reduced such that WiFi module 60 is configured to execute WiFi stack module 95, WiFi stack interface module 125, and CDMA and WiFi interface driver module 130. Accordingly, redundancy of module execution is reduced in the illustrated embodiment to improve the efficiency and robustness of communications in either CDMA mode or WiFi mode. Additionally, CDMA processor 20 and WiFi processor 30 each execute CDMA and WiFi interface driver module 130, which provides a communication interface between the to processors and modes of operation.

Figure 5:
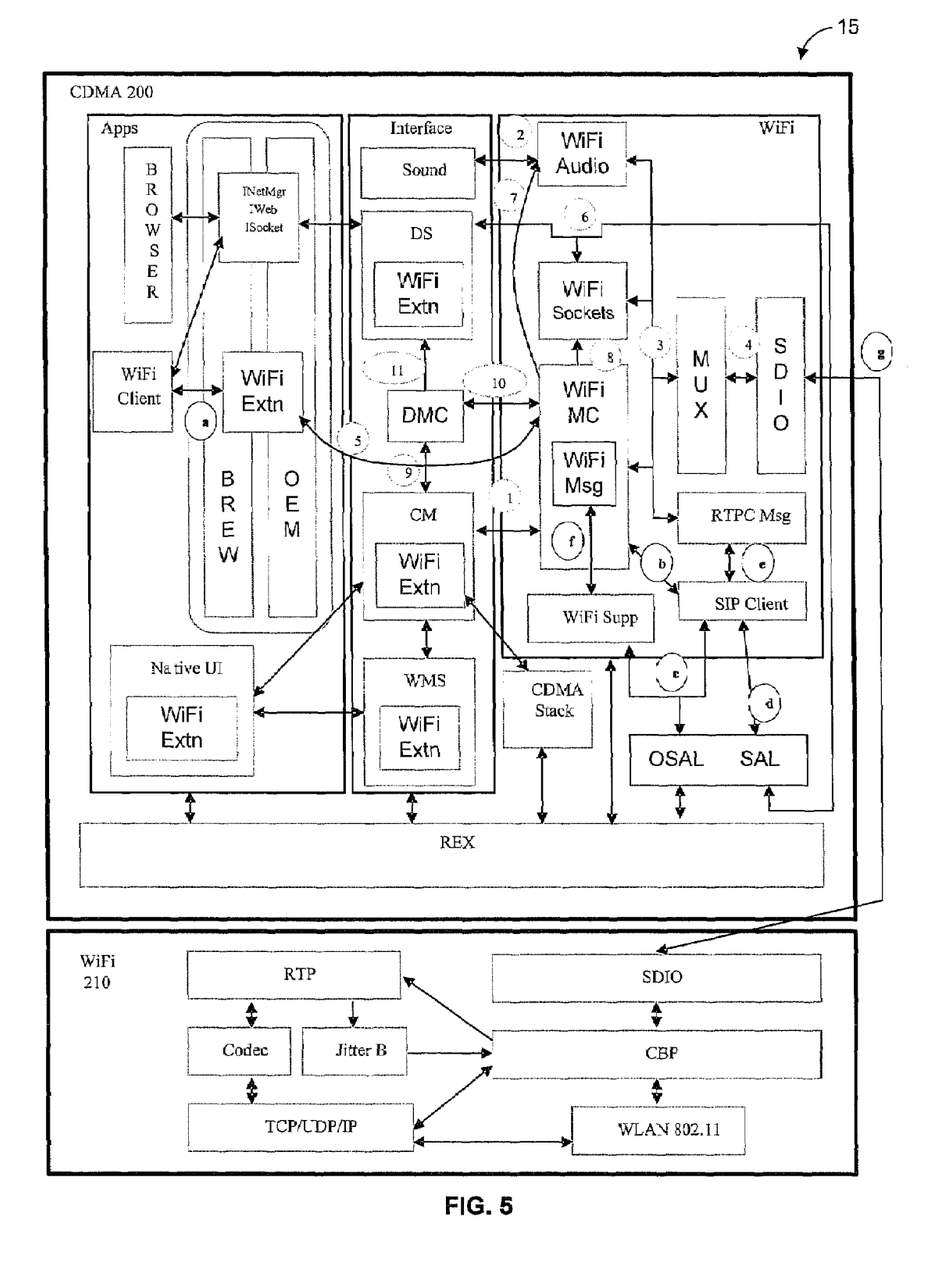
FIG. 5 is a block diagram illustrating an example architecture for a plurality of modules and interfaces in a dual mode wireless communication device according to an embodiment of the present invention.

FIG. 5 is a system diagram illustrating an example architecture for a plurality of modules and interfaces in a dual mode handset 15 according to an embodiment of the present invention. In the illustrated embodiment, the handset 15 comprises a CDMA processor 200 and a WiFi processor 210. For example, CDMA processor 200 can be a mobile station modem ("MSM") single chip solution and the WiFi device 210 can be a Marvell® card that is integrated with the handset 15.

In the illustrated embodiment, the CDMA processor executes a plurality of application modules, interface modules, and WiFi modules. It also executes a CDMA stack and abstraction layer modules for the operating system and sockets. The application modules include a browser for network browsing, a WiFi client, and a native user interface. Additionally the applications include a BREW module and an OEM module that support respective application modules. Certain WiFi specific extensions are provided in a WiFi extensions module that operates in conjunction with the BREW module and the OEM module.

The interface modules include a sound module, a data services module, a dual mode controller module, a call manager module, and a wireless message system module. WiFi specific extensions are added to the data services module, the call manager module, and the wireless message service module to allow for interoperability between the CDMA processor 200 and the WiFi processor 210.

The WiFi modules include a WiFi audio module, a WiFi sockets module, a WiFi main controller module, a WiFi message module, a WiFi supplicant module, a MUX module, an secure digital input output ("SDIO") module, and a session initiation protocol ("SIP") client module.

Additionally, a plurality of interfaces communicatively connect the various modules. For example, interface A between the WiFi client module and the BREW module provides an application programming interface ("API") to the WiFi client for performing 802.11 related procedures, interface B between the WiFi main controller module and the SIP client module provides an API to the WiFi main controller module for performing call related procedures using the SIP client, interface C between various clients and the operating system abstraction layer provides an API for operating system services, interface D between various clients and the socket abstraction layer provides an API for socket services, interface E between the SIP client module and the MUX module provides an API to the SIP client module to send and receive proprietary commands and responses via the SDIO module, interface F between the WiFi supplicant module and WiFi message module provides an API to the supplicant for performing 802.11 related security procedures, and interface G between the CDMA processor and the WiFi processor via the SDIO module provides a messaging API between the WiFi modules on the CDMA processor and the various modules on the WiFi processor.

Additional interfaces are also provided. For example, interface 1 between the call manager module and the WiFi main controller module provides an API for call related procedures, interface 2 between the WiFi audio module and the sound module provides an API for periodically sending and receiving PCM data (e.g., every 20 ms), interface 3 between various clients and the MUX module provides an API for clients that want to read and write data to the WiFi processor via the SDIO module, interface 4 between the MUX module and the SDIO module provides an API for DAL to read and write data via the SDIO module, interface 5 between the BREW module and the WiFi main controller module provides an API for communication between the BREW module and the WiFi messages module for performing 802.11 procedures, interface 6 between various clients and the WiFi sockets module provides an API for the data services module and the socket abstraction layer to perform socket related activities via the SDIO module, interface 7 between the WiFi main controller and the WiFi audio module provides an API for the WiFi main controller module to start and stop audio, interface 8 between the WiFi main controller and the WiFi sockets module provides an API for the WiFi main controller module to communicate with the WiFi sockets module for socket clean up, interface 9 between the dual mode controller module and the WiFi main controller module provides an API for the dual mode controller to communicate with the WiFi main controller, interface 10 between the dual mode controller module and the call manager module provides an API for the dual mode controller to communicate with the call manager module, and interface 11 between the dual mode controller module and the data services module provides an API for the dual mode controller to know the current state of the handset 15.

In one embodiment, the native user interface module provides the user interface subsystem for the handset 15, the browser module provides the user interface for network browsing, the WiFi client module controls and determines access to a WiFi network, the wireless message system module interacts with the user interface module to provide SMS functionality, the dual mode controller module interacts with the call manager module, data services module, and WiFi main controller modules to provide DCMA and WiFi access control, the call manager module interacts with the user interface module for call related features, the data services module interacts with the user interface module for data related features, the sound module handles the transmission and reception of user voice to and from the microphone and speaker on the handset 15, the WiFi main controller module interacts with the call manager module, the dual mode controller module, and the SIP client module to provide WiFi services for the handset 15, the WiFi sockets module interacts with the data services module and the socket abstraction layer module to provide socket APIs via the SDIO module to the TCP/UDP/IP stack on the WiFi processor, the WiFi audio module interacts with sound module to periodically send and receive PCM coded voice data (e.g., every 20 ms) and encode and decode the voice data over SDIO, the WiFi message module encodes and decodes WLAN messages to and from the firmware on the WiFi processor 210, the WiFi supplicant module provides key generation for encryption and decryption of data sent over a wireless link between the handset 15 and an access point, the SIP client module implements the functionality described in various related requests for comments, the software multiplexer/demultiplexer module abstracts the SDIO driver and makes the various WiFi modules independent of the hardware interface and also buffers the outgoing and incoming data using queues, the SDIO module provides the hardware interface and drivers between the CDMA processor and the WiFi processor, the operating system abstraction layer abstracts the services of the operating system so that various modules (e.g., third party modules) can be easily integrated, and the socket abstraction layer abstracts various socket APIs so that various software modules (e.g., third party modules) can be easily integrated.

In one embodiment, certain variables are advantageously maintained by the handset 15 to facilitate efficient dual mode operation. For example, the machine identification number ("MIN") can be maintained for use by the SIP client module, in addition to password information and display name information that can also be maintained for use the SIP client module. Additionally, SIP server information can be maintained including the IP address and port number of the SIP server and the fully qualified domain name of the server. Other advantageous information that can be maintained in one embodiment includes certain parameters or limits, e.g., the number of retries for CDMA acquire when WiFi mode is available, the number retries for downloads, the time period for periodic registration, whether WiFi mode is enabled or disabled, the mode preference (CDMA or WiFi), whether dynamic IP address assignment is enabled, and user defined parameters, for example IP configuration information including IP address, netmask, broadcast IP address, default gateway information, and domain name server information, just to name a few.

Advantageously, one embodiment may provide functionality in the user interface by including an annunciator module configured to display the WiFi icon on the screen of the handset 15 and display the signal strength for the WiFi signal. The user interface may also include a settings module that provides a submenu for enabling and disabling WiFi mode, establishing a mode preference and dynamic host configuration protocol ("DHCP") settings, and IP address configuration (if DHCP is not enabled). Other message modules may also be provided that give status updates during firmware downloads, the SIP registration process, and other WiFi enabled states. An idle screen module can also be provided that displays the WiFi profile selected by the WiFi client module and displays the name of the internet service provider or WiFi network provider. Additional functionality can also be provided through a service handling module that allows the user to add WiFi as a service on a field deployed handset 15.

In the illustrated embodiment, the WiFi client module is configured to operate as a dynamically loadable BREW application that can run in the background. The various WiFi extension modules can be implemented as static extensions to their respective underlying modules.

Figure 6:
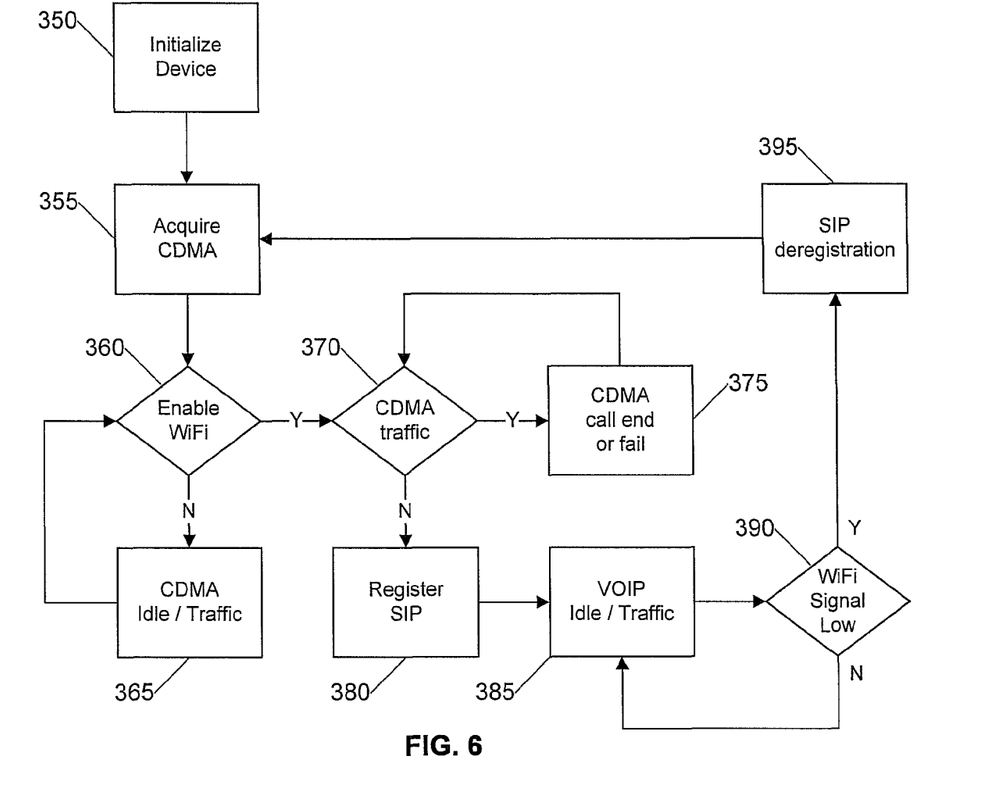
FIG. 6 is a flow diagram illustrating an example process for efficient dual mode communication according to an embodiment of the present invention.

FIG. 6 is a flow diagram illustrating an example process for efficient dual mode communication according to an embodiment of the present invention. The illustrated process can be carried out in alternative embodiments by devices such as the dual mode handsets previously described with respect to FIGS. 2 through 5. Initially, in step 350 the handset is initialized, for example during power up or a reset procedure. Next, in step 355 the handset acquires the CDMA signal. Once the CDMA signal has been acquired the handset checks to determine if WiFi access is configured to be enabled, as shown in step 360. In one embodiment, a variable may be set by the user that instructs the handset to automatically enable WiFi access. Alternatively, WiFi access may be the preferred mode for the handset. As determined in step 360, if WiFi is not to be enabled, then in step 365 the handset enters a state where there is CDMA traffic or CDMA is idle. The handset may be configured to periodically check back to see if WiFi should be enabled, which would return the process to step 360. Alternatively, a user may manually instruct the handset to enable WiFi, which would also return the process to step 360.

As determined in step 360, if WiFi is to be enabled, then in step 370 the handset checks to see if there is currently active CDMA traffic. If there is active CDMA traffic, then in step 375 the handset waits for the CDMA call to end or fail, at which time the CDMA traffic ends. When there is no CDMA traffic, as determined in step 370, the handset performs a session initiation protocol ("SIP") registration in step 380 to enable voice communications on the WiFi network. In one embodiment, SIP registration includes updating a voice over internet protocol ("VOIP") server that associates an IP address with a phone number so that calls to the telephone number for the handset are correctly routed to the IP address of the handset on the WiFi network as VOIP calls.

After the handset has registered then it is available for VOIP traffic and maintains a state where it may be idle or active with respect to VOIP traffic, as shown in step 385. Advantageously, the handset periodically checks in step 390 to determine whether the WiFi signal strength remains above a certain threshold. The threshold may be set so that a certain level of signal strength is maintained while the handset is available for VOIP traffic. If, as determined in step 390, the WiFi signal strength is adequate, handset maintains its state. If the WiFi signal strength is too low, however, then the handset deregisters in step 395 and returns to step 355 where the handset re-acquires the CDMA signal. In this fashion, a handset may efficiently and seamlessly transition between CDMA and WiFi modes during operation.

Figure 7:
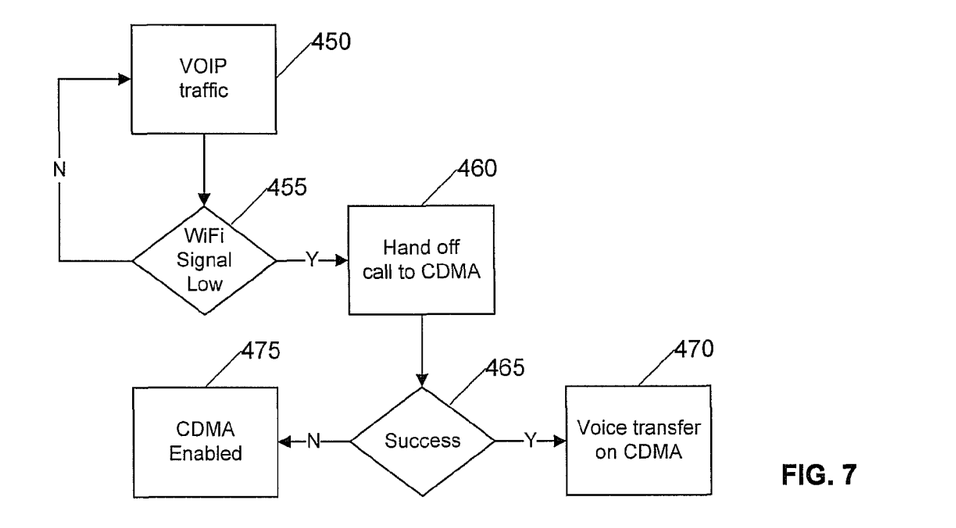
FIG. 7 is a flow diagram illustrating an example process for call handoff from a first air interface to a second air interface according to an embodiment of the present invention.

FIG. 7 is a flow diagram illustrating an example process for call handoff from a first air interface to a second air interface according to an embodiment of the present invention. The illustrated process may be carried out in various embodiments by dual mode handsets such as those previously described with respect to FIGS. 2 through 5. Initially, in step 450 the handset is in WiFi mode and is actively engaged in sending and receiving VOIP traffic. During this active state, in step 455 the handset periodically checks the signal strength of the WiFi signal to ensure that the signal remains strong enough to maintain the VOIP traffic. If the signal strength is not too low, the process returns to step 450 and the handset remains in WiFi mode processing VOIP traffic. If, as determined in step 455, the WiFi signal is too low, the handset hands off the call to the CDMA mode, as shown in step 460. If the handoff was successful, as determined in step 465, then the voice traffic transitions over to the CDMA mode in step 470. Alternatively, if the handoff was not successful then the handset returns to the CDMA enabled ready state in step 475, where it is available for CDMA traffic.

Figure 8:
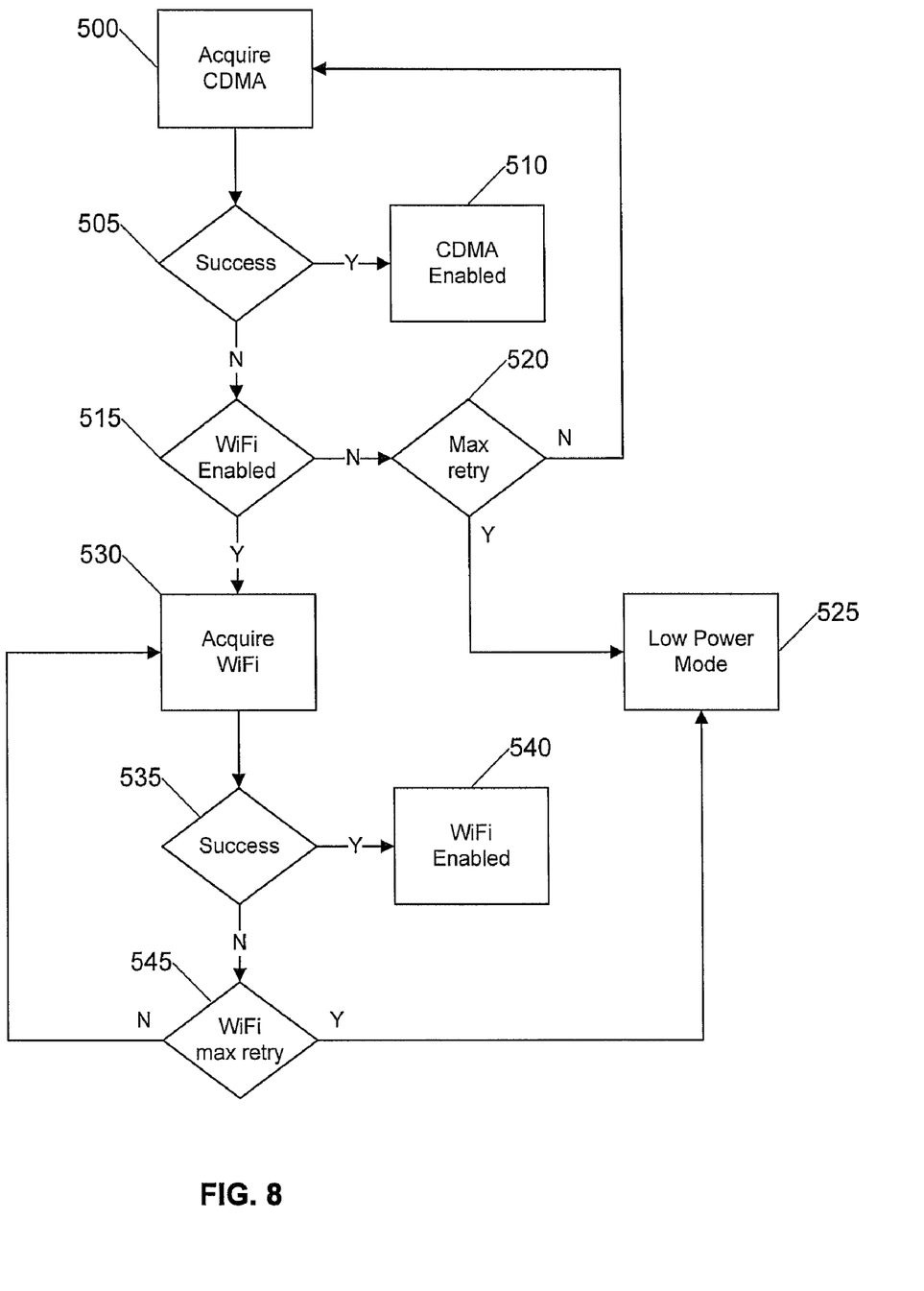
FIG. 8 is a flow diagram illustrating an example process for acquiring a second air interface connection when no first air interface signal is available according to an embodiment of the present invention.

FIG. 8 is a flow diagram illustrating an example process for acquiring a second air interface connection when no first air interface signal is available according to an embodiment of the present invention. The illustrated process may be carried out in various embodiments by dual mode handsets such as those previously described with respect to FIGS. 2 through 5. Initially, in step 500 the handset attempts to acquire the CDMA signal. If, as determined in step 505, the CDMA acquisition is successful, then the handset moves into the state where it is CDMA enabled and available for CDMA traffic, as shown in step 510.

However, if the CDMA acquisition is not successful, then in step 515 the handset checks to see if it is configured and authorized (or instructed, e.g., by the setting of a system parameter or preference) to enable WiFi. If not, then in step 520 the handset determines if it has reached the maximum number of retry attempts for CDMA acquisition. If it has not reached the maximum number, the handset returns to step 500 where it attempts to acquire the CDMA signal again and the process continues. If the maximum number of retry attempts has been reached, then in step 525 the handset goes into low power mode in order to conserve resources while it is unable to acquire a signal.

If the handset determines in step 515 that it should enabled WiFi, then in step 530 the handset attempts to acquire the WiFi signal. If the signal is successfully acquired, as determined in step 535, then in step 540 the handset moves into the WiFi enabled state and it is available for WiFi traffic such as VOIP calls. If the signal was not acquired, then in step 545 the handset determines if it has reached the maximum number of retry attempts for WiFi acquisition. If it has not reached the maximum number, the handset returns to step 530 where it attempts to acquire the WiFi signal again and the process continues from there. If, however, the maximum number of retry attempts has been reached, then the handset goes into low power mode in step 525 in order to conserve resources while it is unable to acquire a signal.

In one embodiment, depending on the preferences or other configuration parameters of the handset, when it is in low power mode the handset may periodically attempt to acquire the CDMA signal by resetting the maximum number of retry attempts for CDMA acquisition to zero and returning to step 500. Alternatively, the handset may reset the maximum number of retry attempts for WiFi acquisition to zero and return to step 530.

It should be noted that those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A dual mode wireless communication device, comprising:
   a first processor configured to manage communications over a first communication link;
   a second processor configured to manage communications over a second communication link;
   a data storage area configured to store modules executable by said first or second processor;
   a BREW module stored in said data storage area and configured to be executed by the first processor and enable a user interface module for the second processor;
   an operating system module stored in said data storage area and configured to be executed by the first processor; and
   an interface driver module stored in said data storage area and configured to be executed by the first processor and the second processor;
   wherein said first and second processors redundantly execute said interface driver module to establish a communication interface between said first and second processors.

2. The device of claim 1, wherein the operating system module enables a user interface call module, a user interface network browsing module, a first plurality of communication stack modules and a first plurality of communication stack interface modules, and wherein the first processor is further configured to execute a communication link supplicant module.

3. The device of claim 2, wherein the first plurality of communication stack modules enabled by the operating system module comprises a first communication link stack module.

4. The device of claim 2, wherein the plurality of communication stack modules enabled by the operating system module comprises an SIP stack module.

5. The device of claim 1, wherein the second processor is further configured to execute a supplicant module for the second communication link.

6. The device of claim 1, wherein the second processor is further configured to execute a jitter buffer module.

7. The device of claim 1, wherein the second plurality of communication stack modules enabled by the second processor comprises an RTP stack module.

8. A dual mode wireless communication device comprising:
   a first processor configured to manage communications over a first air interface;
   a second processor configured to manage communications over a second air interface;
   a data storage area configured to store modules executable by said first or second processor;
   a BREW module stored in said data storage area and configured to be executed by the first processor and enable a user interface module for the second processor;
   an operating system module stored in said data storage area and configured to be executed by the first processor;
   an interface driver module stored in said data storage area and configured to be executed by the first processor and the second processor;
   wherein said first and second processors redundantly execute said interface driver module to establish a communication interface between said first and second processors.

9. The device of claim 8, wherein the operating system module enables a user interface call module, a user interface network browsing module, a first plurality of communication stack modules, a first plurality of communication stack interface modules and a voice codec module, and wherein the first processor is further configured to execute a supplicant module for the second processor.

10. The device of claim 9, wherein the first plurality of communication stack modules enabled by the operating system module comprises a stack module for the first air interface.

11. The device of claim 9, wherein the first plurality of communication stack modules enabled by the operating system module comprises an SIP stack module.

12. The device of claim 8, wherein the second processor is further configured to execute a supplicant module for the second air interface.

13. The device of claim 8, wherein the first processor is further configured to execute a jitter buffer module.

14. The device of claim 8, wherein the first plurality of communication stack modules enabled by the first processor comprises an RTP stack module.

* * * * *